United States Patent
Osmond

(10) Patent No.: US 8,793,257 B2
(45) Date of Patent: Jul. 29, 2014

(54) METHOD FOR IMPROVING THE EFFECTIVENESS OF HASH-BASED DATA STRUCTURES

(76) Inventor: Roger Frederick Osmond, Littleton, MA (US)

( * ) Notice: Subject to any disclaimer, the term of this patent is extended or adjusted under 35 U.S.C. 154(b) by 366 days.

(21) Appl. No.: 12/779,727

(22) Filed: May 13, 2010

(65) Prior Publication Data

US 2010/0299333 A1    Nov. 25, 2010

Related U.S. Application Data

(60) Provisional application No. 61/180,875, filed on May 24, 2009.

(51) Int. Cl.
*G06F 7/00* (2006.01)
*G06F 17/30* (2006.01)

(52) U.S. Cl.
USPC .......................................................... 707/747

(58) Field of Classification Search
USPC .......................................................... 711/202
See application file for complete search history.

(56) References Cited

U.S. PATENT DOCUMENTS

| | | | |
|---|---|---|---|
| 5,361,349 A | | 11/1994 | Sugita et al. |
| 6,052,697 A | * | 4/2000 | Bennett et al. ................. 1/1 |
| 6,578,036 B1 | * | 6/2003 | Lu et al. ................. 1/1 |
| 6,625,592 B1 | * | 9/2003 | Dyer et al. ................. 1/1 |
| 6,938,059 B2 | | 8/2005 | Tamer et al. |
| 7,043,494 B1 | * | 5/2006 | Joshi et al. ................. 1/1 |
| 8,176,319 B2 | | 5/2012 | Osmond et al. |
| 8,185,751 B2 | | 5/2012 | Osmond et al. |
| 2001/0049671 A1 | | 12/2001 | Joerg |
| 2002/0019908 A1 | | 2/2002 | Reuter et al. |
| 2004/0030822 A1 | | 2/2004 | Rajan et al. |
| 2004/0078353 A1 | | 4/2004 | Brock et al. |
| 2004/0215729 A1 | | 10/2004 | Kuwata et al. |

(Continued)

FOREIGN PATENT DOCUMENTS

WO    2007011164 A1    1/2007

OTHER PUBLICATIONS

Using Multiple Hash Functions to Improve IP Lookups Andrei Broder, Michael Mitzenmacher IEEE Infocom 2001.*

(Continued)

*Primary Examiner* — Uyen Le
(74) *Attorney, Agent, or Firm* — Pepper Hamilton LLP

(57) ABSTRACT

A method to improve the effectiveness of hash-based data structures includes configuration of a data structure and transformation of hash codes as produced by a hash function, to yield a more uniform distribution of data amongst the slots in a data structure. Transformation results in a non-uniform but predictable distribution of hash codes. Configuration exploits the predictable nature of the transformed hash codes to accomplish more uniform and therefore more efficient distribution of items stored in a hash-based data structure.

10 Claims, 5 Drawing Sheets

Possible Distribution using 1st through 3rd Digits

(56) References Cited

U.S. PATENT DOCUMENTS

| | | |
|---|---|---|
| 2005/0195660 A1 | 9/2005 | Kavuri et al. |
| 2006/0059173 A1* | 3/2006 | Hirsch et al. .................. 707/100 |
| 2006/0248200 A1 | 11/2006 | Stanev |
| 2006/0294126 A1* | 12/2006 | Ganjoo ......................... 707/101 |
| 2007/0143859 A1 | 6/2007 | Ogi et al. |
| 2007/0276765 A1* | 11/2007 | Hazel et al. ..................... 705/71 |
| 2008/0065639 A1* | 3/2008 | Choudhary et al. ............... 707/7 |
| 2008/0127354 A1 | 5/2008 | Carpenter et al. |
| 2008/0147960 A1 | 6/2008 | Sugino et al. |
| 2009/0228514 A1* | 9/2009 | Liu et al. ....................... 707/102 |
| 2009/0271412 A1 | 10/2009 | Lacapra et al. |
| 2010/0299333 A1 | 11/2010 | Osmond |
| 2010/0299362 A1 | 11/2010 | Osmond |
| 2011/0055536 A1 | 3/2011 | Banga et al. |

OTHER PUBLICATIONS

Using Perl for Statistics: Data Processing and Statistical Computing Giovanni Baiocchi University of Durham Jurnal of Statistical Software May 2004, vol. 11, Issue 1.*

Title: "Using Multiple Functions to Improve IP Lookups" a publication of IEEE Infocom 2001. Anderei Broder and Michael Mitzenmacher.*

Wen-Yuan Chen "Multiple-watermarking scheme of the European Article Number Barcode using similar code division multiple access technique", Applied Mathematics and Computation 197 (2008), pp. 243-261.*

Aprian Mehis, et al., Designing and Optimizing Dell\EMC SAN Configurations Part 1, Power Solutions, Jun. 2004, pp. 94-98.

* cited by examiner

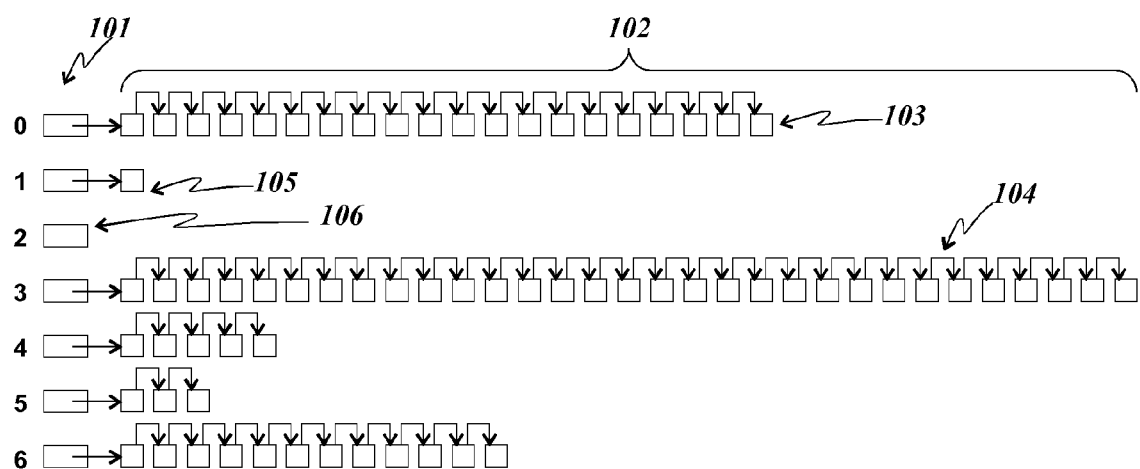
*FIG. 1 - Simple Hash Table*

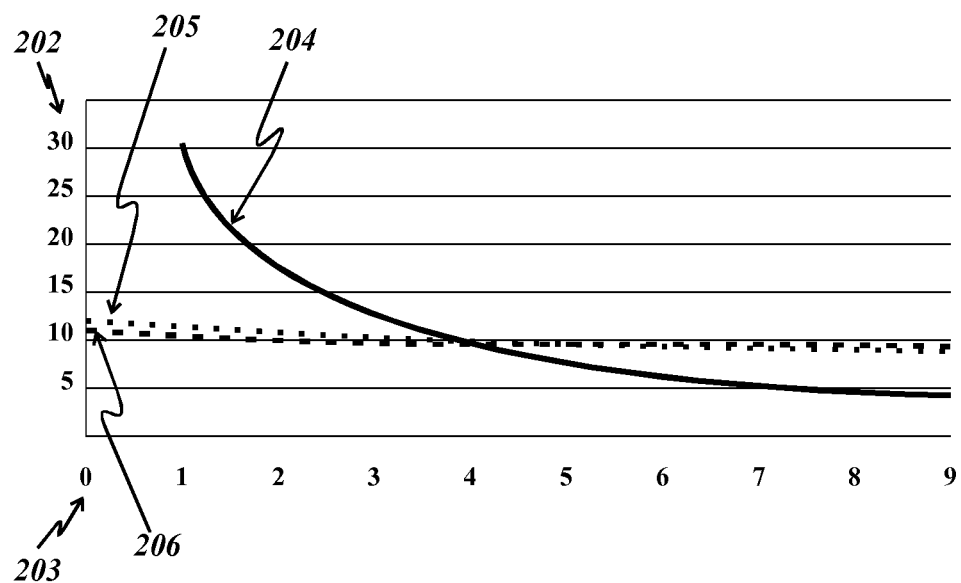
FIG. 2 - Probability of Digits in First Three Positions

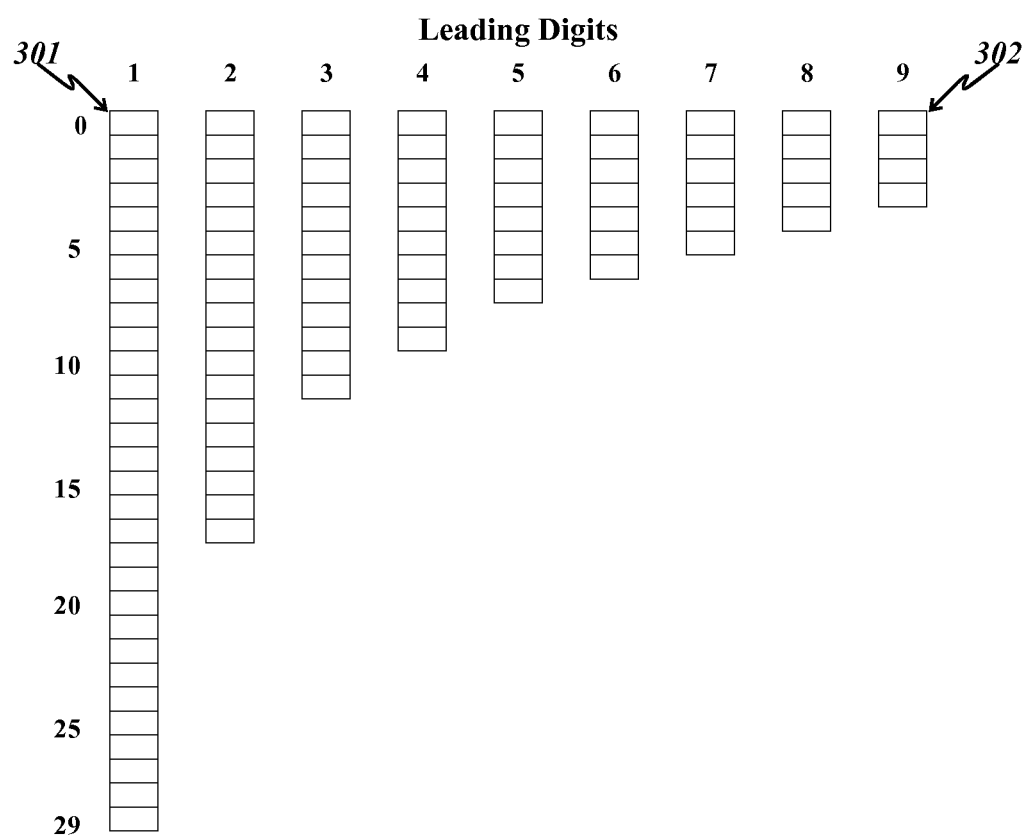
FIG 3 - Configuration to Complement 1st Digit Distribution

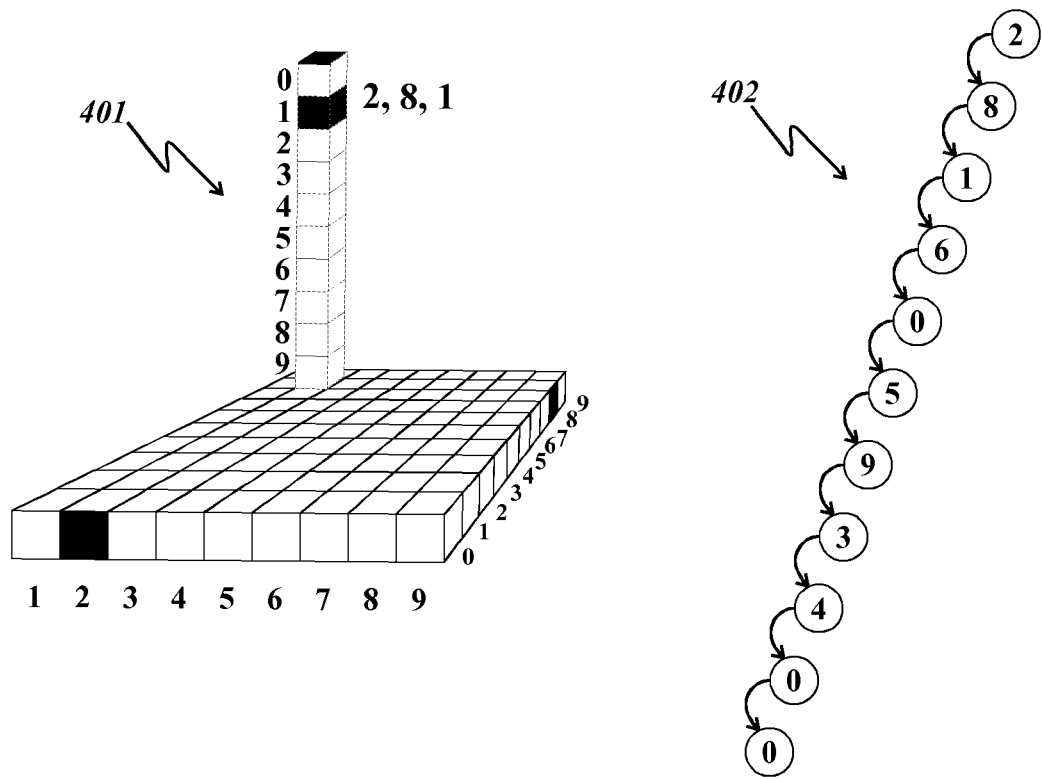
FIG. 4 - Sequence of Digits in Hash Code 28160593400

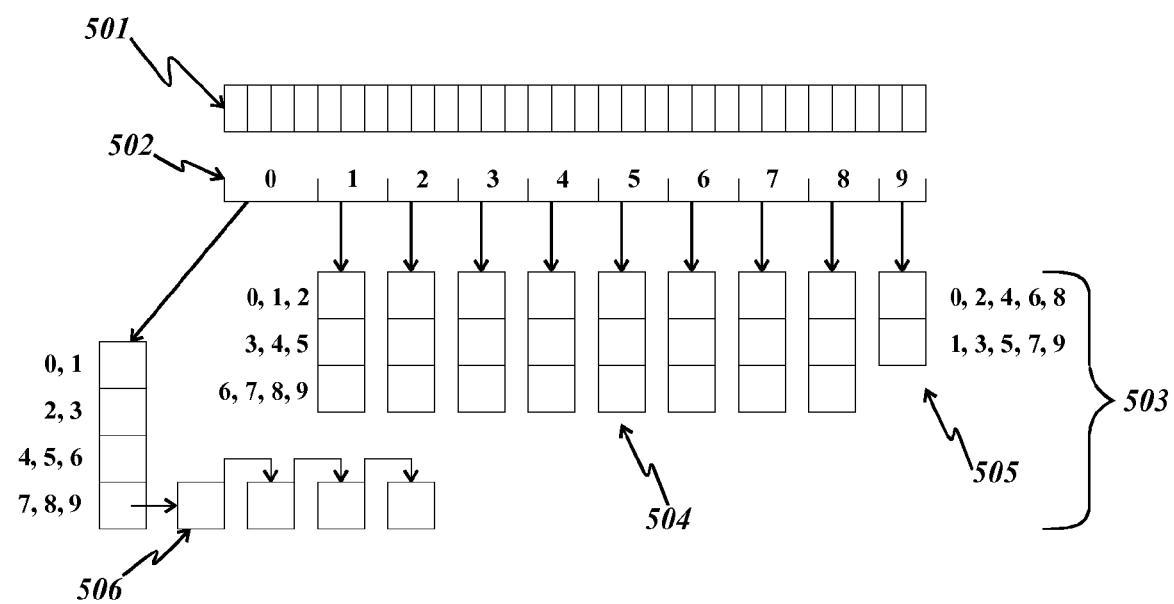
FIG. 5 - Possible Distribution using 1st through 3rd Digits

METHOD FOR IMPROVING THE EFFECTIVENESS OF HASH-BASED DATA STRUCTURES

This invention claims priority to U.S. Provisional Patent Application No. 61/180,875 filed May 24, 2009.

BACKGROUND OF THE INVENTION

This invention relates generally to computer software and more specifically to software data structures and abstract data types.

Hash-based data structures (hash tables) are commonly used software data structures. Hash tables use a hash function to map certain unique identifiers (e.g., names) to their associated values (e.g., personnel records). A hash function transforms the identifier (called a key) into a value (called a hash code) that is then further transformed into an index that represents an element of an array (called a slot) where the associated value would reside.

In practice, resource limitations and other design considerations dictate that there will not be enough slots, nor will the hash function be so perfect as to map each possible key to a unique slot index. The common case where more than one identifier hashes to the same index is called a collision. When a collision occurs, a hash table takes measures to disambiguate the items, typically by means of a traversable data structure like a linked list or chain.

A hash table with no collisions is among the most efficient data structures available with respect to insertion, deletion and lookup. In such a case as there are no collisions, the average cost for each lookup is effectively the cost of the hash function, and is independent of the number of items in or the capacity of the table. When a hash table has collisions, the lookup efficiency degrades to approach that of a traversable data structure, a function of the number of items in the traversable structure.

It is advantageous to employ a method by which collisions would be minimized.

BRIEF SUMMARY OF THE INVENTION

In accordance with the present invention, a method for improving the effectiveness of hashed data structures includes a configuration of the data structure and a transformation of hash codes as produced by the hash function, to yield a more uniform distribution of data amongst the slots in a data structure.

While it might be possible to devise a specialized hash function for a uniformly distributed data set, such a hash function would perform very poorly for any other data sets, and so would be of limited usefulness.

The present invention recognizes that distribution of data, keys and hash codes need not be uniform, but that the distribution of hash codes generated for a data set need only be predictable. The method of the present invention transforms the range of generated hash codes such that they become predictable and, knowing the predictable distribution resulting from the transformation, configures a data structure in such a manner as to exploit that predicted distribution in such a manner as to ensure relatively uniform (and therefore efficient) distribution of the items stored in that data structure.

LIST OF TABLES

Table 1 depicts the predicted distribution of digits for the first 6 digit positions according to Benford's Law.
Table 2 depicts the distribution of digits, at the $3^{rd}$ position and higher, for slot sizes between 2 and 9.

BRIEF DESCRIPTION OF THE SEVERAL VIEWS OF THE DRAWING

The present invention may be better understood by referring to the following description taken in conjunction with the accompanying drawings in which:

FIG. 1 depicts a simple hash table of slots and chains,
FIG. 2 is a graph depicting the predicted distribution of decimal digits in a collection of values, per Benford's Law,
FIG. 3 depicts a possible configuration of a data structure to complement the method's transformation of hash codes based on first decimal digits per Benford's Law,
FIG. 4 shows 2 representations of the effect of reusing digit positions in the same allocation process, and
FIG. 5 depicts a possible distribution of items in slots using the $1^{st}$ through $3^{rd}$ digits of a hash code.

DETAILED DESCRIPTION OF THE INVENTION

The method of the present invention transforms a range of hash codes as generated by a hash function such that the hash code distribution becomes predictable. Knowing the predictable distribution resulting from the transformation, the method configures a data structure in such a manner as to exploit the predicted distribution to achieve a relatively uniform distribution of items, and therefore to minimize collision, leading to better scalability and efficiency.

FIG. 1 depicts a simple hash table in which there are an uneven distribution of items and collision chains of varying lengths. Item 101 depicts the slots (7 of them in this example). Item 102 depicts the chains associated with each of the slots. In practice, the number of slots would be higher and the lengths of chains might be much longer than shown in the diagram. In the preferred embodiment of the invention, the method uses the distribution of digits within a sample according to Benford's Law to drive the transformation and configuration.

Benford's Law, as described in "*The Law of Anomalous Numbers*" in Proc. Amer. Phil. Soc 78, pp 551-72, states that the distribution of digits in certain data sets will conform to a specific pattern based on the log of the digit value in the digit base. While the pattern of the first decimal digit, for example, is not at all uniform, it is predictable and as such can be used to drive transformation and configuration of a data structure.

FIG. 2 shows the distribution of the first, second and third digits of numbers as predicted by Benford's Law, where Item 204 is a line representing the probability of the first digit, Item 205 is a line representing the probability of the second digit and Item 206 is a line representing the probability of the third digit. Item 203 is the X axis value set denoting the value of the digits (note that there is no value for the first digit being 0 because leading zeroes are not significant). Item 202 is the Y axis value set showing the percentage of the total of digits as predicted by Benford's Law. Note that the distribution of digits becomes more uniform with each subsequent digit position, but that the distribution is predictable, regardless of the digit position.

Ideal data sets for Benford's Law should have a wide range of values, covering multiple orders of magnitude. Hash functions can produce hash codes that span multiple orders of magnitude and so are reasonable candidates for application of the law. Even data sets with other than ideal characteristics can result in distributions that resemble those predicted by Benford's Law.

The method of the present invention has no dependency on any specific hash function. It may be reasonable to devise a hash function that could generate a range of values especially well suited to the method of the present invention (e.g. to favor application of Benford's Law).

FIG. 3 depicts a 100 slot data structure configuration to complement the method's transformation of hash codes using the first decimal digit of the hash codes as predicted by Benford's Law. The predicted distribution in that case would have about 30% ones, 18% twos, 12% threes, 10% fours, 8% fives, 7% sixes, 6% sevens, 5% eights and 5% nines. As the total of these approximate percentages is actually 101, the percent of nines is adjusted to be 4%. The number 100 was chosen for illustration only and has no other significance except to help clarify the distribution.

By configuring a data structure in such a way as to have a number of slots corresponding, at whatever scale, to the predicted percentage of each digit, the slots in that data structure are more likely to have uniform distributions. For example, if there are, as predicted, approximately 6 times more items with hash codes beginning with the digit '1' than beginning with the digit '9', then having 6 times more slots for hash codes beginning with '1' than for hash codes beginning with '9' will help to ensure that no slots in the data structure have chain lengths significantly longer or shorter than any other.

Selecting the specific slot in a data structure in which to place an item depends on the number of possible slots corresponding to that digit. If for example, there are 4 slots, then a method must be applied to allocate fairly across those 4 slots.

The method of the current invention can be applied to this selection as well.

Care must be taken, however to avoid using the same digit position more than once in a single operation. For example, if the first digit were used to make the first slot assignment, then the first digit should not be used again for the same item. FIG. 4 shows 2 representations of this issue. Item 401 shows a 3-dimensional array indexed by the first 3 digits of the hash code "28160593400". Note that all hash codes beginning with '2' belong to the same row, and that all hash codes beginning with '28' belong together, and that all hash codes beginning with '281' belong together, and so forth. Item 502 shows a simple tree structure whose nodes are the digits, in order, of the hash code "28160593400". Note that the digits form a kind of path through the tree such that all hash codes with first digits of '2' belong to the same branch of the tree, all nodes beginning with '28' belong to the same sub-branch, all nodes beginning with '281' belong to the same sub-branch, and so forth.

Using the example 100 slot configuration in FIG. 3, if a leading (first) digit is '1', then there are 30 slots. To assign items fairly to each of those 30 slots, the second digit is used.

According to Benford's Law, as shown in Table 1, the distribution of second digits would be about 12% zeroes, 11% ones and twos, 10% threes, fours and fives, 9% sixes, sevens and eights, and 8% nines. For 30 items (the number of slots corresponding to a '1' in the first position in the example), this would correspond to 4 slots for zeroes, 3 slots each for digits '1' through '8', and 2 slots for digit '9'. Note well that the second and subsequent digit positions, unlike the first digit position, can include the digit '0'.

TABLE 1

Digit Distribution per Benford's Law

| | | Digit Position | | | | |
|---|---|---|---|---|---|---|
| | | $1^{st}$ | $2^{nd}$ | $3^{rd}$ | $4^{th}$ | $5^{th}$ |
| Digit | 0 | 0.0000 | 11.9679 | 10.1784 | 10.0176 | 10.0018 |
| | 1 | 30.1030 | 11.3890 | 10.1376 | 10.0137 | 10.0014 |
| | 2 | 17.6091 | 10.8821 | 10.0972 | 10.0098 | 10.0010 |
| | 3 | 12.4939 | 10.4330 | 10.0573 | 10.0059 | 10.0006 |
| | 4 | 9.6910 | 10.0308 | 10.0178 | 10.0019 | 10.0002 |
| | 5 | 7.9181 | 9.6677 | 9.9788 | 9.9980 | 9.9998 |
| | 6 | 6.6947 | 9.3375 | 9.9401 | 9.9941 | 9.9994 |
| | 7 | 5.7992 | 9.0352 | 9.9019 | 9.9902 | 9.9990 |
| | 8 | 5.1153 | 8.7570 | 9.8641 | 9.9863 | 9.9986 |
| | 9 | 4.5757 | 8.4997 | 9.8267 | 9.9824 | 9.9982 |

Continuing with the example, there is still the need to allocate fairly amongst the slots corresponding to the second digit. Item 501 in FIG. 5 shows the 30 first-tier slots corresponding to a '1' first digit. Item 502 shows the distribution of those 30 slots according to the second digit. If the second digit is '5', for example, there would be 3 second tier slots for hash codes with second digits of '5' (Item 504).

Benford's Law predicts that the distribution of the $3^{rd}$ digit is even more uniform than for the second digit, and would range from about 10.18% for zeroes to about 9.83% for nines. When dealing with slot numbers as small as the example, one can assume that the distribution is roughly 10% for each digit, but slightly favoring lower digit values at the expense of higher digit values. As depicted by Item 503 in FIG. 5, the 10 possible digits are allocated to fewer than 10 slots according to the predicted distribution. For 4 slots, the configuration would place items with a $3^{rd}$ digit of '0', or '1' in the first slot, items with a $3^{rd}$ digit of '2' or '3' in the second slot, items with a $3^{rd}$ digit of '4', '5' or '6' in the third slot, and item with a $3^{rd}$ digit of '7', '8' or '9' in the fourth slot. For 3 slots, the configuration would place items with a $3^{rd}$ digit of '0', '1' or '2' in the first slot, items with a $3^{rd}$ digit of '3', '4' or '5' in the second slot and items with a $3^{rd}$ digit of '6', '7', '8' or '9' in the third slot. For 2 slots, the configuration would divide evenly the 10 possible digits between the 2 slots. FIG. 5 shows a possible configuration of even numbers in one slot and odd numbers in the other. Another possible configuration would place the lower digits in the first slot and the higher digits in the second. For single slots, the configuration places all items in the same slot. Table 2 shows a possible configuration for slot counts (by $3^{rd}$ or higher digit) of 2 through 9 items.

TABLE 2

Digit Distribution in Smaller Sub-slots

| | Number of Slots | | | | | | | |
|---|---|---|---|---|---|---|---|---|
| | 2 | 3 | 4 | 5 | 6 | 7 | 8 | 9 |
| Digits | 0, 1, 2, 3, 4 | 0, 1, 2 | 0, 1 | 0, 1 | 0 | 0 | 0 | 0 |
| | 5, 6, 7, 8, 9 | 3, 4, 5 | 2, 3 | 2, 3 | 1 | 1 | 1 | 1 |
| | | 6, 7, 8, 9 | 4, 5, 6 | 4, 5 | 2, 3 | 2 | 2 | 2 |
| | | | 7, 8, 9 | 6, 7 | 4, 5 | 3 | 3 | 3 |
| | | | | 8, 9 | 6, 7 | 4, 5 | 4 | 4 |
| | | | | | 8, 9 | 6, 7 | 5 | 5 |
| | | | | | | 8, 9 | 6, 7 | 6 |
| | | | | | | | 8, 9 | 7 |
| | | | | | | | | 8, 9 |

In the preceding examples, the hash code represented a simple character string and the assumption might be that the slot corresponding to the highest digit used (the 3$^{rd}$ digit in the example) would hold the item corresponding to the hash code. While this is certainly an implementation option, it is also possible that the item contained in such a slot would itself be a data structure (e.g. a hash table, array or linked list). This would result in an effective multi-tiered hash table structure. In the example, the first 3 digit positions were used, but there is no reason that the method cannot use additional digits, or use digits in different sequences.

The present invention combines data structure configuration and transformation of non-uniform, but predictable distributions of hash codes to achieve relatively uniform distribution of associated values. While the preferred embodiment uses Benford's Law for predictability, there are possibly other predictable patterns that could be exploited. The description and examples illustrate some of the benefits of the method. Reducing or eliminating traversals in data structures is certainly one benefit, but the method might apply well to other contexts, including but not limited to image manipulation and security.

Embodiments provide for various methods for improving the effectiveness of hashed data structures. For instance, a first example method for improving the effectiveness of hashed data structures comprises: configuration of the data structure and, transformation of hash codes as produced by the hash function, wherein said method yields a more uniform distribution of data amongst the slots in said data structure.

A second example method comprises the first example method, wherein the range of generated hash codes becomes predictable. A third example method comprises the first example method, wherein the predictable distribution of hash codes may be exploited by the configuration of a hash-based data structure such that more uniform distribution of items stored within said data structure is achieved. A fourth example method comprises the first example method, wherein the transformation of hash codes is such that distribution is predicted by application of Benford's Law. A fifth example method comprises the first example method, wherein the transformation of hash codes is such that distribution is predicted by application of other statistical laws or theorems. A sixth example method comprises the first example method, wherein hash code collisions are minimized. A seventh example method comprises the first example method, wherein traversals of linked data structures, as used by hash-based data structures, and resulting from hash code collisions are reduced or eliminated. An eighth example method comprises the first example method, wherein data sets comprise a wide range of values, covering multiple orders of magnitude. A ninth example method comprises the first example method, wherein hash codes may be in the form of an extended sequence of decimal digits. A tenth example method comprises the first example method, wherein the items stored at positions in a hash-based data structure may be themselves data structures, such as arrays, linked lists or hash-based data structures. An eleventh example method comprises the first example method, wherein the digits of a hash code may be applied in sequence from most significant to least significant. A twelfth example method comprises the first example method, wherein the digits of a hash code may be applied in a pattern other than a sequence from most significant to least significant.

What is claimed is:

1. A computer-implemented method for minimizing collisions in hash based data storage operative on a computing device, the computer-implemented method comprising:
    determining a predicted distribution of a plurality of digits of a plurality of hash codes generated by a hash function;
    generating at least one hash data structure comprising a plurality of data slots configured based on the predicted distribution, wherein a number of the plurality of data slots is based on the predicted distribution of at least one of the plurality of digits; and
    uniformly distributing at least one element associated with the plurality of hash codes in the plurality of data slots based on the plurality of digits.

2. The computer-implemented method of claim 1, further comprising using at least one prediction model to determine the predicted distribution.

3. The computer-implemented method of claim 2, wherein the at least one prediction model is associated with Benford's Law.

4. The computer-implemented method of claim 1, wherein generating at least one hash data structure comprises generating the at least one hash data structure as a three-dimensional array.

5. The computer-implemented method of claim 1, wherein generating at least one hash data structure comprises generating the at least one hash data structure as a tree data structure.

6. The computer-implemented method of claim 1, wherein the at least one element comprises at least one data structure.

7. The computer-implemented method of claim 1, wherein the plurality of hash codes comprise at least three digits and the at least one element is uniformly distributed based on a first three digits of the at least three digits.

8. The computer-implemented method of claim 1, further comprising providing a number of the plurality of data slots for each of the plurality of digits corresponding to the predicted distribution of the plurality of digits.

9. The computer-implemented method of claim 1, further comprising assigning at least one digit of the plurality of digits to the plurality of data slots corresponding to the predicted distribution of the plurality of digits.

10. The computer-implemented method of claim 1, further comprising:
   obtaining a percentage for each of the plurality of digits based on the predicted distribution; and
   providing a number of the plurality of data slots for each of the plurality of digits in proportion to the percentage for each of the plurality of digits.

* * * * *